Dec. 23, 1958
C. D. COOK ET AL
2,866,142
CAPACITOR WITH NAPHTHALENE DERIVATIVE
DIELECTRIC IMPREGNANT
Filed Jan. 20, 1954
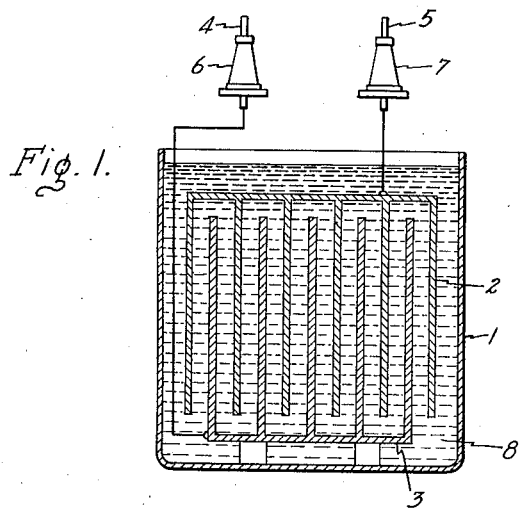
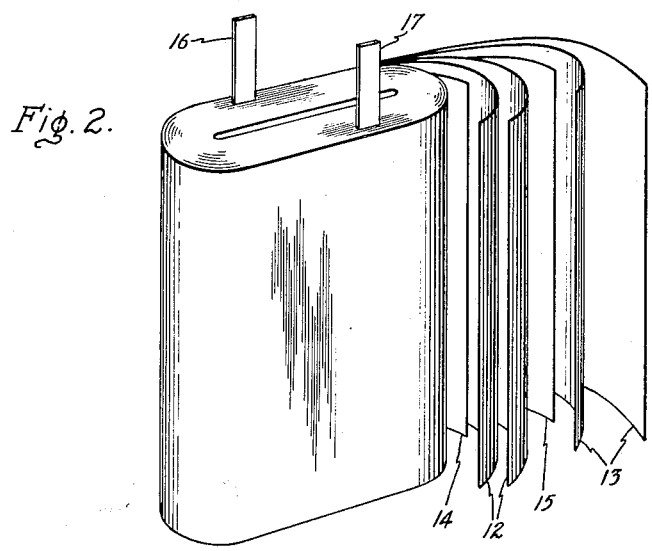
Inventors
Clinton D. Cook,
Ralph E. Plump,
by Gilbert P. Tarleton
Their Attorney.

United States Patent Office 2,866,142
Patented Dec. 23, 1958

2,866,142

CAPACITOR WITH NAPHTHALENE DERIVATIVE DIELECTRIC IMPREGNANT

Clinton D. Cook, Burlington, Vt., and Ralph E. Plump, Pittsfield, Mass., assignors to General Electric Company, a corporation of New York Application January 20, 1954, Serial No. 405,126

3 Claims. (Cl. 317—258)

The present invention relates to electrical capacitors. More particularly, it relates to an electrical capacitor having a dielectric impregnant of a naphthalene derivative and which is characterized by a longer life under both high temperature and low temperature operating conditions.

In recent years capacitor research has had as one of its aims the development of dielectric material possessing long term stability under operating temperatures of 125° C. and higher. For any given foil or plate surface, the capacitor having the most temperature stable characteristics will have a preferred rating.

It is an object of this invention to provide a capacitor having a long life under high temperature operating conditions.

It is another object of this invention to provide a capacitor having a naphthalene derivative as the dielectric.

In accordance with one aspect of this invention, the above objects are accomplished in an electric capacitor comprising the combination of cooperating metal electrodes and interposed dielectric spacer, the spacer being impregnated with a stabilized reaction product of isobutylene polymer having more than two isobutylene units and a compound selected from the group consisting of naphthalene and methyl naphthalene.

Many different capacitors are now available from the industry, ranging in size and filling materials from very small to large and containing dielectric liquids of dielectric constant from about 2.2 and up. One type which has been in steady demand, principally because of dependability, is the so-called oil-filled type, and it is principally this type in which the present invention offers even greater dependability, as will be shown further on.

The drawing illustrates two types of capacitors which are improved by the incorporation therein of the dielectric materials of this invention.

The capacitor, as conventionally shown in Fig. 1, comprises a casing 1 in which are mounted closely spaced sets of armatures 2, 3 which are supported from a cover plate (not shown). The armatures may be maintained in proper operative relation by spacers (not shown) consisting of suitable insulating material. The respective spaced sets of capacitor plates are connected respectively to external terminals 4, 5 which are provided with suitable insulators 6, 7. A dielectric element 8 shown as having an exaggerated thickness consists of a stabilized reaction product of isobutylene polymer having more than two isobutylene units and a compound selected from the group consisting of naphthalene and a methyl naphthalene.

Fig. 2 shows a capacitor of the rolled type in which a plurality of sheets of paper 12, 13 are used as spacers between flexible strip armatures 14, 15. Terminals 16, 17 are provided and the assembly is housed in a casing (not shown). The papers 12, 13 are impregnated with a dielectric material comprising, as in the case of Fig. 1, a reaction product of isobutylene polymer having more than two isobutylene units and a compound selected from the group consisting of naphthalene and methyl naphthalene.

The dielectric materials of this invention are best prepared by a Friedel-Crafts reaction of polyisobutylene with naphthalene or methyl naphthalene. Preferably, the polyisobutylene consists of more than two isobutylene units and less than twenty. The selection of any particular polyisobutylene for reaction with either naphthalene or methyl naphthalene is governed by the viscosity desired in the final product. We have found that the higher the molecular weight of the polyisobutylene chain, the higher will be the viscosity of the end product. For this reason, tri-isobutylene may be chosen for a lower viscosity product. On the other hand, we have found that a very satisfactory product can be obtained by alkylating naphthalene with a polyisobutylene of molecular weight around 370. The viscosity of the resultant product was 230 centipoises at 100° F. Much higher molecular weight material can of course be employed although the conditions of the synthesis might have to be modified in the direction of more catalyst, higher temperatures of reaction, or longer reaction times. It should be understood that by polyisobutylene is meant the commercially available liquids containing a mixture of branched mono-olefins. For example, tri-isobutylene is not a single substance as we use it, but may contain 2,4,4,6,6 pentamethylheptene-1, 2,4,4,6,6 pentamethylheptene-2, 2,2,4,6,6 pentamethylheptene-3, and 2-neopentyl-4,4,dimethylpentene-1. This mixture serves to provide us with a product which similarly comprises a mixture of isomers, not only regarding the positions possible on the naphthalene nucleus, but also in the variety of the attached alkyl side chains.

The Friedel-Crafts reaction of polyisobutylene with naphthalene or methyl naphthalene proceeds in accordance with the known art of alkylation. While anhydrous aluminum chloride is the preferred catalyst, other Friedel-Crafts catalysts such as ferric chloride, aluminum bromide, boron trifluoride, sulfuric acid, etc., might also be used.

For any desired synthesis, the conditions of preparation should be adjusted for maximum yield. Undesirable side reactions can occur such as the depolymerization of the polybutene producing shorter chains which then attach to the naphthalene, or even, under high reaction temperatures, might escape as isobutene. Another side reaction is polyalkylation of the naphthalene which is generally to be avoided or minimized since the resulting product might then have too high a molecular weight and viscosity, or might actually contain crystalline derivatives. For example, illustrating the possibilities of depolymerization and polysubstitution, when naphthalene was reacted with tri-isobutylene in the presence of aluminum chloride, and the temperature was allowed to rise to 150° C., a crystalline fraction was obtained, M. P. 145°, identified as 2,6 di-tert-butylnaphthalene. The oil fraction, consisting of other alkylated naphthalenes, was naturally a useful liquid for our purpose. However, the ultimate separation of a solid component in a capacitor dielectric liquid is generally undesirable on electrostatic principles, and if the step of first removing any solids can be obviated by proper control of the synthesis, such control should be exerted.

Polyisobutylenes alone are less stable than their derivatives after reaction with naphthalene or methylnaphthalene. The double bond in polyisobutylene is sensitive to some degradative influences, but when the double bond is converted in part to a single alkyl-aryl bond, a stabilizing effect is obtained. Polyisobutylenes above a molecular weight of about 200 become increasingly insoluble in acetone; the reaction products with naphthalene are soluble in acetone, and these properties can be employed to separate unreacted, viscous, polyisobutylene from the desired product. Partitioning of the acetone is no problem since it can be reclaimed from both phases.

The normal boiling range of our products is over 300° C. and this is a definite practical advantage because most capacitors are filled while hot and under the best vacuum attainable. The low vapor pressure of our products causes less fouling of the vacuum lines than results from lower boiling oils.

The following examples typify the general rules of alkylation which we have found to be adequate for our purposes. Anyone familiar with the art will recognize that modifications of synthesis can be followed in any case without departing from the spirit of this invention.

*Example 1*

Naphthalene (192 gms., 1.5 mols) was alkylated with 554 gms. (ca. 1.5 mols) of polyisobutylene having an average molecular weight of 370. Aluminum chloride (40 gms.) was used as the catalyst, and the reaction temperature was not allowed to exceed 75° C. After one-half hour, the reaction was self sustaining and stirring was continued for almost 3 days. The characteristic odor of naphthalene was gone and the batch was washed free of aluminum chloride and finally was refined by successive treatments with thermally activated fuller's earth. The final product had a viscosity of 230 centipoises at 100° F. and a refractive index of 1.5185 at 25° C. At 30° C., the resistivity was $6,225 \times 10^{12}$ ohm cm. and the 60 cycle power factor was 0.128%. At 100° C., the resistivity was $135 \times 10^{12}$ ohm cm. and the 60 cycle power factor was 0.152%.

The product from Example 1 was tested in capacitors for stability in direct comparison with a commercially used capacitor oil. A stabilizer for direct current applications, anthraquinone, was added to each oil in 0.5% by weight quantities. Six capacitors filled with the commercial oil, and three capacitors filled with our new product were subjected to 1000 volts D. C. stress at 125° C. until they failed. The capacitors containing our product did not fail, on the average, until they had exceeded by 60% the average life of the control capacitors, a very significant gain in stability.

*Example 2*

Naphthalene (354 gms., ca. 2.75 mols) was alkylated with 465 gm. of commercial tri-isobutylene (ca. 2.75 mols) with the aid of 10 gms. of aluminum chloride and mild heating. After four hours of continuous stirring, the batch was refined with light treatments of fuller's earth and was then fractionally distilled at atmospheric pressure. The product was taken from 280° up to 400°, most distilling above 300° C. It had a pour point of $-17°$ C. and a steady 60 cycle corona level of 40 kv. in a 0.2 inch space, needle points to quarter inch barrier.

*Example 3*

Methyl naphthalene (1.5 mols, 213 gms.) and a polyisobutylene of a chain length averaging about 15 isobutylene units (840 gms., 1 mol) are mixed with about 60 gms. of anhydrous ferric chloride and with strong stirring, the mixture is very gradually brought up to a temperature of 200° C. and is maintained here for a period of four hours. (Under some conditions, ferric chloride is a chlorinating agent and care must be exercised regarding this fact in addition to the possibility that some of the polyisobutylene will depolymerize.) The catalyst is washed out with acidified water and after drying, the oil layer is stirred at least once with an equal volume of acetone. The acetone extract containing the desired alkylated methylnaphthalene is then fractionally distilled to recover the acetone and any unreacted methylnaphthalene (B. P. 241°). The distillation is then continued under greatly reduced pressure, preferably less than 1 mm. of mercury, and a fraction is taken boiling above 280° C. Due to the occurrence of a large number of isomers, the useful fraction will have a wide boiling range. This fraction is then defined further by treating with fuller's earth, for capacitor or cable use.

By varying the molecular weight of the polyisobutylene, the viscosity of the product can be varied leaving the other properties essentially unchanged. On the other hand, the original degree of alkylation of the naphthalenes can be so chosen to modify the end product of reaction, that a considerable variety of properties can be established. For example, the product from methyl naphthalene and the polyisobutylene used in Example 1 had a viscosity of only 110 centipoises at 100° F.

While the dielectric materials of Examples 1–3 are satisfactory for use in capacitors without further treatment we prefer to add a small quantity of stabilizers to these materials. Quinone compounds generally have a stabilizing effect and we have found anthraquinone particularly suitable for this purpose. The proportion of anthraquinone may be as high as 5% and as little as 0.1% anthraquinone shows a marked stabilizing influence. Normally we use about 0.5% anthraquinone as a stabilizer for our dielectric materials.

Capacitors incorporating therein the dielectric materials of this invention have power factors within the range 0.1 to 1.0 over a wide temperature range. Prolonged operation at temperatures somewhat in excess of 100° C. does not rapidly increase this power factor to a serious degree. Under life tests they have shown a life expectancy up to 60% greater than capacitors similar in all respects except that the comparison capacitors have standard dielectric materials used in capacitors regularly sold.

While the present invention has been described with reference to particular embodiments thereof, it will be understood that numerous modifications may be made by those skilled in the art without actually departing from the invention. Therefore, we aim in the appended claims to cover all such equivalent variations as come within the true spirit and scope of the invention.

What we claim as new and desire to secure by Letters Patent of the United States is:

1. An electric capacitor comprising the combination of cooperating metal armatures and interposed dielectric material, said dielectric material consisting of a stabilized reaction product of a polymer composed of an average of about 6–7 units of isobutylene and a compound selected from the group consisting of naphthalene and methylnaphthalene.

2. An electric capacitor comprising the combination of cooperating metal armatures and interposed dielectric spacer, said spacer being impregnated with a stabilized reaction product of a polymer composed of more than six units and less than 20 units of isobutylene and a compound selected from the group consisting of naphthalene and methylnaphthalene.

3. An electric capacitor comprising the combination of cooperating metal armatures and interposed dielectric material, said dielectric material consisting of a stabilized reaction product of a polymer composed of an average of more than six units and less than 20 units of isobutylene and a compound selected from the group consisting of naphthalene and methylnaphthalene.

References Cited in the file of this patent

UNITED STATES PATENTS

| | | |
|---|---|---|
| 1,776,309 | Clark | Sept. 23, 1930 |
| 2,143,566 | Moser | Jan. 10, 1939 |
| 2,226,589 | Smyers | Dec. 31, 1940 |
| 2,436,110 | Larsen | Feb. 17, 1948 |
| 2,615,955 | McLean | Oct. 28, 1952 |
| 2,719,182 | Ross | Sept. 27, 1955 |

OTHER REFERENCES

Sauer: "Stabilization of Dielectrics," Industrial and Engineering Chemistry, January 1952, pages 135 to 140.